(12) United States Patent
Balzer et al.

(10) Patent No.: US 9,228,554 B2
(45) Date of Patent: Jan. 5, 2016

(54) SUPPORTING A DRIVER OF A MOTOR VEHICLE IN UTILIZING AN AUTOMATIC START-STOP SYSTEM

(71) Applicant: GM GLOBAL TECHNOLOGY OPERATIONS LLC, Detroit, MI (US)

(72) Inventors: Dirk Balzer, Nierstein (DE); Stipe Dujic, Heusenstamm (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 212 days.

(21) Appl. No.: 13/962,116

(22) Filed: Aug. 8, 2013

(65) Prior Publication Data
US 2014/0046578 A1  Feb. 13, 2014

(30) Foreign Application Priority Data
Aug. 9, 2012 (DE) .......................... 10 2012 015 744

(51) Int. Cl.
*F02N 11/08* (2006.01)
*F02D 28/00* (2006.01)
(Continued)

(52) U.S. Cl.
CPC ............ *F02N 11/0818* (2013.01); *B60W 50/14* (2013.01); *F02D 28/00* (2013.01); *F02N 11/0814* (2013.01); *F02N 11/0844* (2013.01); *F02N 15/00* (2013.01);
(Continued)

(58) Field of Classification Search
CPC ............ F02N 11/0814; F02N 11/0818; F02N 11/0844; F02N 2300/2006; F02D 41/061

USPC ............... 701/112, 113, 101, 102; 123/179.4, 123/179.3, 179.1, 198 DB, 325, 332
See application file for complete search history.

(56) References Cited

U.S. PATENT DOCUMENTS 4,286,683 A 9/1981 Zeigner et al.
6,463,900 B1 10/2002 Wakabayashi et al.
(Continued)

FOREIGN PATENT DOCUMENTS

DE 10211464 A1 9/2003
EP 0171365 A2 2/1986
EP 2343209 A1 7/2011

OTHER PUBLICATIONS

German Patent Office, German Search Report for Application No. 102012015744.4, dated Jan. 8, 2013.

*Primary Examiner* — Mahmoud Gimie
(74) *Attorney, Agent, or Firm* — Ingrassia Fisher & Lorenz PC

(57) ABSTRACT

A method and a device for supporting a driver of a motor vehicle in utilizing an automatic engine start-stop system of the vehicle is provided. A method includes predetermining or determining a first limit value $t_{G1}$ that indicates a time, which, after an engine has been stopped through the start-stop system, has to elapse until an energy saving through the stopping of the engine compared with a continued operation of the engine is obtained. A time currently carried out through the start-stop system is registered, where $t_0$ is a point of time at which the engine is stopped through the start-stop system and t is a time. A visually, haptically, and/or acoustically perceptible information dependent on the $t_{G1}$ and $\Delta t(t)$ from which the driver can gather the time with effect from which the engine stop leads to the energy saving is generated and output.

13 Claims, 1 Drawing Sheet

(51) Int. Cl.
*F02N 15/00* (2006.01)
*B60W 50/14* (2012.01)
*F02D 41/06* (2006.01)
*F02D 41/22* (2006.01)
*B60W 30/18* (2012.01)
*B60W 50/00* (2006.01)

(52) U.S. Cl.
CPC . *B60W 30/18018* (2013.01); *B60W 2050/0089* (2013.01); *F02D 41/061* (2013.01); *F02D 2041/228* (2013.01); *F02N 2300/2006* (2013.01); *Y02T 10/48* (2013.01)

(56) References Cited

U.S. PATENT DOCUMENTS

2012/0136553 A1* 5/2012 Takeuchi et al. ............. 701/102
2012/0316740 A1* 12/2012 Funakoshi et al. ............ 701/54

* cited by examiner

SUPPORTING A DRIVER OF A MOTOR VEHICLE IN UTILIZING AN AUTOMATIC START-STOP SYSTEM

CROSS-REFERENCE TO RELATED APPLICATION

This disclosure claims priority to German Patent Application No. DE 10 2012 015 744.4, filed Aug. 9, 2012, which is incorporated herein by reference in its entirety.

TECHNICAL FIELD

The technical field relates to a method and to a device for supporting a driver of a motor vehicle in utilizing an automatic start-stop system. The technical field furthermore relates to a motor vehicle with such a device.

BACKGROUND

The automatic engine start-stop system is an automatically operating system for reducing the fuel consumption of a motor vehicle in standing phases (for example at a traffic light stop). The automatic engine start-stop system carries out automatic engine stop when neutral is engaged and the clutch of the motor vehicle disengaged. When the clutch pedal is actuated again, the automatic engine start-stop system carries out an automatic engine start. The automatic engine start-stop system typically carries out the engine stop only under certain predetermined conditions: only when some temperature preconditions (engine, outside temperatures in a certain range for example between PC and 30° C.) are maintained. Typically, the automatic system also does not work when for example the battery is severely discharged, when the inside temperature has not yet reached the value preselected by the air conditioner, adequate vacuum is no longer present in the brake booster or when the vehicle is in heating mode. The opening of the belt buckle or the engine hood or driver's door can also result in the automatic engine stop failing to materialize. When the engine is shut down, an automatic engine start is typically also carried out when the battery voltage is very low, no vacuum is available in the brake booster any longer or when one wishes to let the motor vehicle roll downhill. Further information regarding the automatic engine start-stop system can be taken from the prior art.

At least one object herein is to provide a method and device to make an optimized utilization of the automatic engine start-stop system possible for the driver. In addition, other objects, desirable features and characteristics will become apparent from the subsequent summary and detailed description, and the appended claims, taken in conjunction with the accompanying drawings and this background.

SUMMARY

In an exemplary embodiment, a method for supporting a driver of a vehicle in utilizing an automatic engine start-stop system of a motor vehicle is provided. This method comprises the following steps: firstly, predetermining or determining a first limit value $t_{G1}$, which indicates a time, which, after the engine of the motor vehicle was stopped by the automatic engine start-stop system, has to elapse until an energy saving through the stopping of the engine compared with a continued operation of the engine is obtained, secondly, determining the time $\Delta t(t) = |t_0 - t|$ which has elapsed since an engine stop carried out by the automatic engine start-stop system, where $t_0$: the point of time at which the engine stop is stopped by the automatic engine start-stop system, t: time, and thirdly, generating and outputting visually and/or haptically and/or acoustically perceptible information which is dependent on the first limit value $t_{G1}$ and the time $\Delta t(t)$, from which the driver can at least gather the time $\Delta t(t)$ with effect from which the engine stop leads to the energy saving.

The method is based on the idea of indicating to the driver the time with effect from which, dependent on the duration of a current engine stop caused by the automatic engine start-stop system, the engine stop is worthwhile, i.e. the time with effect from which (overall) energy saving for the motor vehicle actually materializes through the automatic engine stop. The indication of the information is to prompt the driver, if possible from the traffic point of view, to terminate the automatically executed engine stop only when at least the time $t_{G1}$ has elapsed, for example by pressing the clutch. Obviously, the energy saving which is obtained through the engine stop is the greater the longer the engine remains in the auto stop mode beyond the time $t_{G1}$, before it is restarted. This supports the driver in utilizing the automatic engine start-stop system such that the possible energy saving, i.e. the fuel saving is improved, which finally in addition to the operating costs of the vehicle, reduces the greenhouse gases emitted by the motor vehicle and thus reduces the environmental contamination or the climate effect.

The first limit value $t_{G1}$ can be predetermined as a fixed value applicable to all engine stop operations. For example, such a constant value for $t_{G1}$ can be determined in vehicle-specific test series. For example, the first limit value $t_{G1}$ in this case is determined as a mean value, which takes into account different scenarios of the idle consumption at different ambient conditions and different current energy consumption scenarios (driving light on/off, stereo system on/off, ventilation on/off etc.) of the motor vehicle. Preferably, the first limit value $t_{G1}$ in this case is predetermined as a motor vehicle or motor vehicle type-specific limit value. In an embodiment, the limit value $t_{G1}$ has a value between 1 s and 10 s or 2 s and 8 s, or between 2 s and 5 s. Here, the expression "motor vehicle type-specific" describes a model of a motor vehicle, for example an OPEL Insignia 2.0 CDTI. The term "vehicle-specific" goes beyond that and characterizes the individual motor vehicle with its specific equipment, i.e. with its individual energy consumers (e.g. a particularly high-performance HI-FI system).

In another embodiment, the first limit value $t_{G1}$ in the motor vehicle is currently determined taking into account at least one consumption of fuel and electric energy applicable to a standing phase of the motor vehicle with running engine (at idle). In this variant, a first limit value $t_{G1}$ which is dependent on the current energy consumption situation of the motor vehicle and the current fuel consumption at idle is determined. This currently-determined first limit value is obviously more accurate than a constant first limit value $t_{G1}$ which applies to all scenarios, but its determination requires the provision of the input quantities required for its determination, which, if applicable, are not available in small favorable vehicles. This variable first limit value $t_{G1}$ is thus dependent on a current state vector whose state quantities are correspondingly predetermined.

In an embodiment, registering the time $\Delta t(t) = |t_0 - t|$ that has elapsed since an engine stop was carried out by the automatic engine start-stop system is effected through a timer, which is triggered in each case when the automatic engine start-stop system has stopped the engine at the time $t_0$, and registers and makes available the time that has elapsed since $t_0$. Corresponding methods and devices are easily accessible to the person skilled in the art from the prior art.

For generating and outputting the visually and/or haptically and/or acoustically perceptible information dependent on the first limit value $t_{G1}$ and the time $\Delta t(t)$, with effect from which the driver can at least gather the time $\Delta t(t)$ with effect from which the engine stop results in the energy saving, there are a multiplicity of possibilities. In one embodiment, a unit for outputting the information is present in the motor vehicle in which the (output) state changes at least when the time $\Delta t(t)$ is greater or equal to the first limit value $T_{G1}$: i.e. $\Delta t(t) \geq t_{G1}$ applies. In the simplest case, this unit is a visual display whose display state changes at $\Delta t(t) = t_{G1}$, for example the display is activated at $t_0$ and initially illuminated red. At $\Delta t(t) = t_{G1}$, the display switches from red to green. The driver in this case receives the information as the time with effect from which energy saving occurs through the automatic engine stop. The energy saving generated with the engine stop is obviously the greater the longer the engine stop persists beyond reaching the time $t_{G1}$.

In another embodiment, information dependent on the ratio: $\Delta t(t)/t_{G1}$ is therefore generated and output for example for as long as the engine is in the stop mode. Thus, a bar moves, for example on a continuous color scale changing in color from red via orange, to yellow and green, which bar moves dependent on the ratio: $\Delta t(t)/t_{G1}$ from the red scale region in the direction of the green scale region, wherein the green scale region is reached when $\Delta t(t) = t_{G1}$ applies. Further display possibilities are easily accessible to the person skilled in the art.

Preferably, the output of the information ends as soon as the time $\Delta t(t)$ exceeds a predetermined second limit value $t_{G2}$ and/or as soon as the engine is restarted beforehand through the automatic engine start-stop system. In the latter case, the driver receives a corresponding display during the entire time in which the engine is in the stop mode.

In a further embodiment of the method for the motor vehicle at least one operating time $t_B$, and for each engine stop of a total number P, where P∈[0, 1, 2 . . . ], initiated by the automatic engine start-stop system in the operating time $t_B$, at least its time duration $t_{MS,k}$ where k=0, 1, 2, . . . P are registered and stored, a first ratio value $W_1$, which is dependent on the operating time $t_B$ and the added time durations $t_{MS,k}$, is determined:

$$W_1 = \frac{\sum_{k=1}^{P} t_{MS,k}}{t_B},  \quad (1)$$

and the first ratio value $W_1$ is output and/or an output which is dependent on the first ratio value $W_1$ is generated and output. Here it is assumed that in the operating time $t_B$ under consideration, a total number P of tension stops has taken place. If, in the operating time under consideration, for example no engine stops have taken place, P=0, if 10 engine stops have taken place, P=10. Each completed k-th engine stop furthermore has an individual time duration $t_{MS,k}$, which is calculated from the time difference between the point of time at which the k-th automatic engine start-stop system took place: $t_{0,k}$ and the point of time at which the k-th engine stop was terminated by an automatic engine start $t_{MS,k}$. The corresponding data are each determined and stored in the motor vehicle, so that they can be made available for subsequent calculations depending on the choice of the operating time $t_B$.

The actual benefit of the automatic engine start-stop system for energy saving in the operating time $t_B$ used as a base is thereby illustrated to the driver. The term "operating time" in this case is used synonymously for the terms "operating period of time" or "operating interval" and means the times or the accumulated times in which the motor vehicle was actually operated.

The operating time $t_B$ used as a base for determining the first ratio value $W_1$ is preferably: the operating time of the motor vehicle for a current/past or a plurality of past trip/trips of the motor vehicle, wherein a current not yet completed trip starts with the start-up of the motor vehicle at the beginning of the trip and reaches as far as to the respective current point of time t. Alternatively, the operating time $t_B$ is the operating time of the motor vehicle in a predetermined past period of time (last week, past year, since the beginning of the initial registration of the motor vehicle). For each start-up of the motor vehicle in the past period of time, the operating time is assigned to the respective start up at the start and end of the vehicle operation, which is obtained for example from the electrical activation of the vehicle or the first manual activation of the ignition to the electrical deactivation of the vehicle or to the manual deactivation of the ignition. The operating time $t_B$ in the past period of time is then obtained from the accumulated operating times for vehicle operations in the past period of time. Further alternatively the operating time $t_B$ is the operating time of the motor vehicle for a predetermined distance already covered with the motor vehicle. Analogously, the operating times which were required for the given distance covered are added in this alternative. Obviously, further reference quantities for determining the operating time $t_B$ are possible and also included in herein.

In a further embodiment, the first ratio value $W_1$ prior to its output is weighted with a factor or a function which depends on a driving profile or a mean driving profile during the operating time $t_B$ used as a base. This makes possible taking into account the driving profile dependency of the first ratio value $W_1$. It is thus thereby considered that automatic engine stops above all take place in city traffic because of the many traffic lights and the high traffic density, while on trips with a high component of highway sections, substantially fewer automatic engine stops take place. With the weighting it can be achieved that the first ratio value or quantities derived from the ratio value produce comparable values which are largely independent of the driving profile. Here, the driving profile indicates for example on which type of road (city road, country road, highway etc.) the motor vehicle was proportionally travelling during the operating period of time $t_B$, in particular a first ratio value standardized with respect to city roads or highways can thus be determined. The associated driving profile for example is determined and stored during the operating time of the motor vehicle.

In another embodiment, a second ratio value $W_2$ is determined based on the first limit values $t_{G1,k}$ and periods of time $t_{MS,k}$ assigned to the P engine stops in an operating time $t_B$:

$$W_2 = \frac{A_1}{P}, \quad (2)$$

where $t_{G1,k}$: the respective first limit value $t_{G1}$, $A_1$ is assigned to the k-th engine stop: number of engine stops in the operating time $t_B$, for which an energy saving through the stopping of the engine compared with continued running of the engine was obtained, i.e. to which applies: $t_{MS,k} \geq t_{G1,k}$, and P: total number of engine stops in the operating time $t_B$, and the second ratio value $W_2$ is output and/or an output which is dependent on the second ratio value $W_2$ is generated and output. This output is to encourage the driver in particular to utilize the automatic engine start-stop system such that the second ratio value $W_2$ is preferably "1" or near "1". The second ratio value is "1" when for each automatic engine stop in the operating time $t_B$ under consideration the following applies: $t_{MS,k} \geq t_{G1,k}$, which means that at every engine stop a fuel saving compared with a continued operation of the engine, occurred.

In a further embodiment, based on the quantities: $A_1$, $P$, $t_{MS,k}$, $t_B$ and taking into account energy consumption data of the motor vehicle, an added energy consumption/energy saving based on the operating time $t_B$, which is initiated by using the automatic engine start-stop system, is determined and output. In this method variant, the added energy consumption or the energy savings which occurred through the automatic engine stop is thus determined and output. An added energy consumption (compared with a continued operation of the engine, i.e. non-execution of the automatic engine stop) is always obtained when $t_{MS,k} < t_{G1,k}$ is true. Typically, in order to express this energy in a unit which is familiar to the driver, the added energy consumption/the energy saving, for example is converted into a fuel quantity and output.

Alternatively or additionally, a corresponding indication regarding the equivalent quantity (for example in liters or $m^3$) of greenhouse gases ($CO$, $CO_2$, $NO$, $NO_2$, $NO_X NO_Y$, etc.) or an explicit climate effect (for example a radiation driving value) can be determined and output based on the determined fuel quantity.

The method contemplated herein makes possible to the driver an improved/optimized utilization of the automatic engine start-stop system. Furthermore, it can encourage the driver to improve his behavior when operating the vehicle in connection with the utilization of the automatic engine start-stop system. Finally, the meaningfulness of this system is indicated to the driver upon appropriate utilization of the automatic engine start-stop system, in that for example the energy saved by doing so is directly output.

In another exemplary embodiment, a device for supporting the driver of a motor vehicle in utilizing an automatic engine start-stop system is provided. The device comprises at least one first means, with which a first limit value $t_{G1}$, which indicates a time, which, after the engine of the motor vehicle was stopped by the automatic engine start-stop system, has to elapse until an energy saving through the stopping of the engine compared with a continued operation of the engine is obtained, is made available or determined beforehand, a second means, with which the time $\Delta t(t) = |t_0 - t|$ which has elapsed since an engine stop carried out by the automatic engine start-stop system, where $t_0$: the point of time at which the engine stop is carried out by the automatic engine start-stop system, t: time, is registered, and a third means, with which visually and/or haptically and/or acoustically perceptible information which is dependent on the first limit value $t_{G1}$ and the time $\Delta t(t)$, from which the driver can at least gather the time $\Delta t(t)$ with effect from which the engine stop leads to the energy saving, is generated and output.

Advantages and further configurations of the device are obtained through analogue transfer of the explanations made in connection with the method described above.

In a further embodiment, a motor vehicle with a device as described above is provided.

BRIEF DESCRIPTION OF THE DRAWINGS

The various embodiments will hereinafter be described in conjunction with the following drawing figures, wherein like numerals denote like elements and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
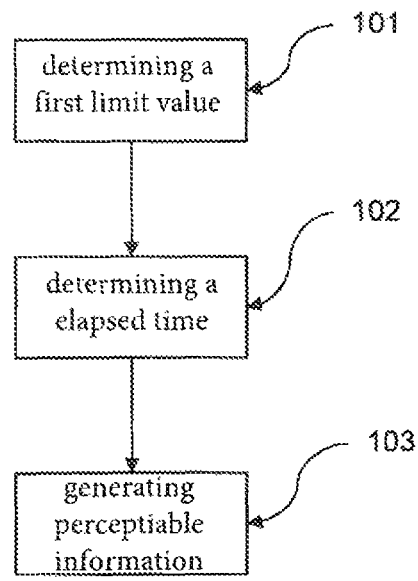
FIG. 1 a schematic flow diagram of the method according to an exemplary embodiment.

FIG. 1 shows a schematic flow diagram of a method for supporting a driver of a motor vehicle in utilizing an automatic engine start-stop system of the motor vehicle according to an exemplary embodiment. The method comprises the following steps. In a first step 101, predetermining or determining a first limit value $t_{G1}$, which indicates a time, which, after the engine of the motor vehicle was stopped by the automatic engine start-stop system, has to elapse until an energy saving through the stopping of the engine compared with a continued operation of the engine is obtained, is carried out. In a second step 102, determining the time $\Delta t(t) = |t_0 - t|$, which has elapsed since an engine stop carried out by the automatic engine start-stop system, where $t_0$: the point of time at which the engine stop is stopped by the automatic engine start-stop system, t: time, is carried out. In a third step 103, generating and outputting visually and/or haptically and/or acoustically perceptible information which is dependent on the first limit value $t_{G1}$ and the time $\Delta t(t)$, from which the driver can at least gather the time $\Delta t(t)$ with effect from which the engine stop leads to the energy saving, is carried out.

Figure 2:
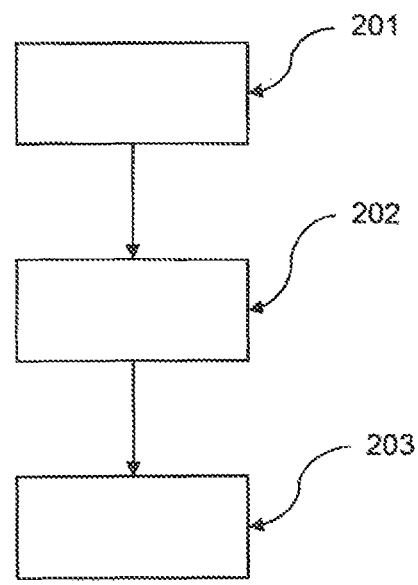
FIG. 2 a schematic representation of the device according to an exemplary embodiment.

FIG. 2 shows a schematic representation of the device according to an embodiment for supporting a driver of a motor vehicle in utilizing an automatic engine start-stop system of the motor vehicle. The device comprises at least one first means 201, with which a first limit value $t_{G1}$, which indicates a time, which, after the engine of the motor vehicle was stopped by the automatic engine start-stop system, has to elapse until an energy saving through the stopping of the engine compared with a continued operation of the engine is obtained, is made available or determined beforehand, a second means 202, with which the time $\Delta t(t) = |t_0 - t|$ which has elapsed since an engine stop carried out by the automatic engine start-stop system, where $t_0$: the point of time at which the engine stop is carried out by the automatic engine start-stop system, t: time, is registered, and a third means 203, with which visually and/or haptically and/or acoustically perceptible information which is dependent on the first limit value $t_{G1}$ and the time $\Delta t(t)$, from which the driver can at least gather the time $\Delta t(t)$ with effect from which the engine stop leads to the energy saving, is generated and output.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for supporting a driver of a motor vehicle in utilizing an automatic engine start-stop system of the motor vehicle, the method comprising the steps of:
determining a first limit value $t_{G1}$ that indicates a time, which, after an engine of the motor vehicle has been stopped through the automatic engine start-stop system, has to elapse until an energy saving through the stopping of the engine compared with a continued operation of the engine is obtained, wherein the first limit value $t_{G1}$ accounts for at least one consumption of fuel and electric energy applicable to a standing phase of the motor vehicle with the engine running;
registering a time $\Delta t(t) = |t_0 - t|$ currently carried out through the automatic engine start-stop system, where
$t_0$: a point of time at which the engine is stopped through the automatic engine start-stop system,
t: a time; and
generating and outputting a visually and/or haptically and/or acoustically perceptible information dependent on the first limit value $t_{G1}$ and the time $\Delta t(t)$, from which the driver can gather the time $\Delta t(t)$ with effect from which the engine stop leads to the energy saving.

2. The method according to claim 1, wherein the first limit value $t_{G1}$ is predetermined as a vehicle-specific limit value, and has a value between 1 s and 10 s, or 2 s and 8 s, or between 2 s and 5 s.

3. The method according to claim 1, in which an output state of a unit for outputting the information which is present in the motor vehicle changes at least when the time $\Delta t(t)$ is greater than or equal to the first limit value $t_{G1}$: i.e. $\Delta t(t) \geq t_{G1}$.

4. The method according to claim 1, wherein an output of the information ends as soon as the time $\Delta t(t)$ exceeds a predetermined second limit value $t_{G2}$ or as soon as the engine is started by the automatic engine start-stop system.

5. The method according to claim 1, wherein for the motor vehicle at least one operating time $t_B$, and for each engine stop of a total number P, where $P \in [0, 1, 2, \ldots]$, initiated by the automatic engine start-stop system in the operating time $t_B$, at least its time duration $t_{MS,k}$ where $k = 0, 1, 2, \ldots P$ are registered and stored, a first ratio value $W_1$, which is dependent on the operating time $t_B$ and an added time durations $t_{MS,k}$, is determined:

$$W_1 = \frac{\sum_{k=0}^{P} t_{MS,k}}{t_B},$$

and the first ratio value $W_1$ is output and/or an output that is dependent on the first ratio value $W_1$ is generated and output.

6. The method according to claim 5, wherein the operating time $t_B$ used as a base for determining the first ratio value $W_1$ is selected as:
an operating time of the vehicle for a current/past or a plurality of past trip/s of the vehicle, or
an operating time of the vehicle in a predetermined past period of time, or
an operating time of the vehicle for a predetermined distance already covered with the motor vehicle.

7. The method according to claim 5, wherein the first ratio value $W_1$ prior to its output is weighted with a factor or a function, which is assigned to a driving profile during the operating time $t_B$.

8. The method according to claim 5, wherein based on the first limit values $t_{G1,k}$ assigned to the P engine stops and time durations $t_{MS,k}$ a second ratio value $W_2$ is determined:

$$W_2 = \frac{A_1}{P},$$

wherein
$t_{G1,k}$: a first limit value in each case assigned to the k-th engine stop
$A_1$: number of the engine stops in the operating time $t_B$, for which an energy saving through the stopping of the engine was obtained compared with a continued operation of the engine, i.e. for which: $t_{MS,k} \geq t_{G1,k}$ applies,
$P_B$: total number of engine stops in the operating time $t_B$; and
the second ratio value $W_2$ is output and/or an output dependent on the second ratio value $W_2$ is generated and output.

9. The method according to claim 8, wherein, based on the quantities: $A_1$, P, $t_{MS,k}$, $t_{G1,k}$, $t_B$ and energy consumption data of the motor vehicle, an added energy consumption/energy saving based on the operating time $t_B$, which is/are caused through the utilization of the automatic engine start-stop system, is determined and output.

10. The method according to claim 9, wherein the added energy consumption/the energy saving is converted into a fuel quantity and output.

11. The method according to claim 10, wherein, based on the fuel quantity, a climate effect is determined and output.

12. A device for supporting a driver of a motor vehicle in utilizing an automatic engine start-stop system of the motor vehicle, the device comprising:
a first means with which a first limit value $t_{G1}$, which indicates a time, which, after the engine of the motor vehicle has been stopped by the automatic engine start-stop system, has to elapse until an energy saving through the stopping of the engine compared with a continued operation of the engine is obtained, is determined, wherein the first limit value $t_{G1}$ accounts for at least one consumption of fuel and electric energy applicable to a standing phase of the motor vehicle with the engine running;
a second means with which a time $\Delta t(t) = |t_0 - t|$ that has elapsed since an engine stop carried out by the automatic engine start-stop system, where
$t_0$: the point of time at which the engine stop is carried out by the automatic engine start-stop system,
t: time,
is registered, and
a third means with which visually and/or haptically and/or acoustically perceptible information, which is dependent on the first limit value $t_{G1}$ and the time $\Delta t(t)$, from which the driver can at least gather the time $\Delta t(t)$ with effect from which the engine stop leads to the energy saving, is generated and output.

13. A motor vehicle with a device for supporting a driver of a motor vehicle in utilizing an automatic engine start-stop system of the motor vehicle, the device comprising:
a first means with which a first limit value $t_{G1}$, which indicates a time, which, after the engine of the motor vehicle has been stopped by the automatic engine start-stop system, has to elapse until an energy saving through the stopping of the engine compared with a continued operation of the engine is obtained, is determined, wherein the first limit value $t_{G1}$ accounts for at least one consumption of fuel and electric energy applicable to a standing phase of the motor vehicle with the engine running;

a second means with which a time $\Delta t(t) = |t_0 - t|$ that has elapsed since an engine stop carried out by the automatic engine start-stop system, where $t_0$: the point of time at which the engine stop is carried out by the automatic engine start-stop system, t: time, is registered, and a third means with which visually and/or haptically and/or acoustically perceptible information, which is dependent on the first limit value $t_{G1}$ and the time $\Delta t(t)$, from which the driver can at least gather the time $\Delta t(t)$ with effect from which the engine stop leads to the energy saving, is generated and output.

* * * * *